United States Patent
Lee et al.

(10) Patent No.: US 10,531,362 B2
(45) Date of Patent: Jan. 7, 2020

(54) METHOD AND APPARATUS FOR PREFORMING INITIAL ACCESS BASED ON THE ACDC CATEGORY IN A WIRELESS ACCESS SYSTEM

(71) Applicant: LG ELECTRONICS INC., Seoul (KR)

(72) Inventors: Ki-Dong Lee, San Diego, CA (US); Sanggook Kim, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 15/560,889

(22) PCT Filed: Mar. 25, 2016

(86) PCT No.: PCT/KR2016/003042
§ 371 (c)(1),
(2) Date: Sep. 22, 2017

(87) PCT Pub. No.: WO2016/153310
PCT Pub. Date: Sep. 29, 2016

(65) Prior Publication Data
US 2018/0124679 A1  May 3, 2018

Related U.S. Application Data

(60) Provisional application No. 62/138,364, filed on Mar. 25, 2015.

(51) Int. Cl.
*H04W 48/06* (2009.01)
*H04W 28/02* (2009.01)
(Continued)

(52) U.S. Cl.
CPC ......... *H04W 48/06* (2013.01); *H04L 47/2475* (2013.01); *H04W 28/0284* (2013.01);
(Continued)

(58) Field of Classification Search
CPC ............ H04W 48/06; H04W 28/0289; H04W 28/0284; H04W 88/02; H04L 47/2475; H04L 47/12
See application file for complete search history.

(56) References Cited

U.S. PATENT DOCUMENTS

| | | | |
|---|---|---|---|
| 2015/0117213 A1* | 4/2015 | Pinheiro | H04W 28/0284 370/235 |
| 2016/0135143 A1* | 5/2016 | Won | H04W 72/005 370/312 |
| 2016/0262068 A1* | 9/2016 | Won | H04W 36/0011 |

FOREIGN PATENT DOCUMENTS

| | | |
|---|---|---|
| WO | WO 2014/160611 A1 | 10/2014 |
| WO | WO 2014/183254 A1 | 11/2014 |

(Continued)

OTHER PUBLICATIONS ("Study on Application-Specific Congestion Control for Data Communication", 3GPP TR 22.806 V13.1.0, Sep. 2014, herein referred to as 3GPP) (Year: 2014).*

(Continued)

*Primary Examiner* — Hashim S Bhatti
*Assistant Examiner* — Abdullahi Ahmed
(74) *Attorney, Agent, or Firm* — Birch, Stewart, Kolasch & Birch, LLP

(57) ABSTRACT

The present invention provides methods and apparatus for performing initial access based on the Application specific Congestion control for Data Communication (ACDC) category mapping scheme. One of methods for performing initial access based on an Application specific Congestion control for Data Communication (ACDC) category in a wireless access system, the method performed by a user equipment (UE) and comprising: receiving, from a home network, ACDC configuration information representing ACDC categories supported by the home network; receiv- (Continued)

ing, from a serving network, ACDC category access parameters including barring information of the serving network; and performing the initial access based on the ACDC configuration information and the ACDC category access parameters when an application packet to be transmitted is generated, wherein the barring information includes barring time value and barring factor value representing a probability of denied or deferred of the initial access according to ACDC category of the serving network.

4 Claims, 5 Drawing Sheets

(51) Int. Cl.
  *H04L 12/859* (2013.01)
  *H04L 12/801* (2013.01)
  *H04W 88/02* (2009.01)
(52) U.S. Cl.
  CPC ......... *H04W 28/0289* (2013.01); *H04L 47/12* (2013.01); *H04W 88/02* (2013.01)

(56) References Cited

FOREIGN PATENT DOCUMENTS

| WO | WO 2015/031202 A1 | 3/2015 | |
| WO | WO-2016118282 A1 * | 7/2016 | ............ H04W 48/06 |

OTHER PUBLICATIONS

3GPP, "3rd Generation Partnership Project; Technical Specification Group Services and System Aspects; Study on Application-Specific Congestion Control for Data Communication (Release 13)", 3GPP TR 22.806 V13.1.0, Sep. 2014, pp. 1-40.

LG Electronics Inc, "Motivation for new WI proposal: Ran Aspects of Application Specific Congestion Control for Data Communication (ACDC)", 3GPP TSG RAN-67, RP-150166, Shanghai, China, Mar. 9-12, 2015, pp. 1-10.

* cited by examiner

[Fig. 1]
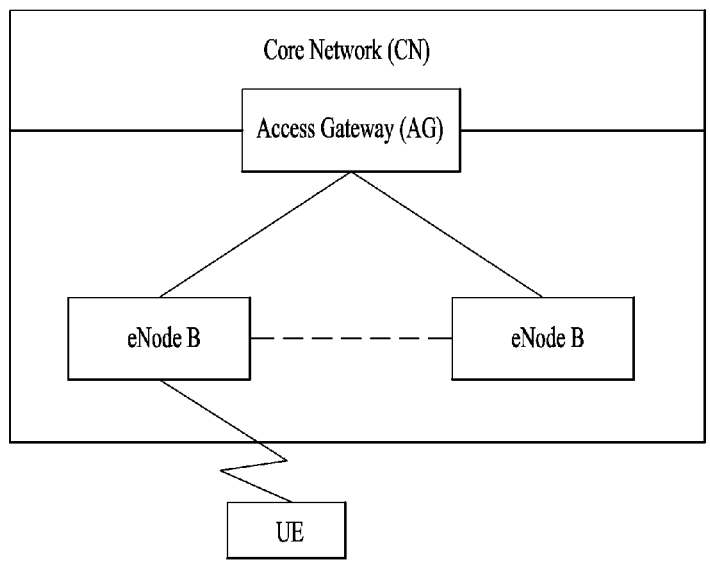
[Fig. 2]
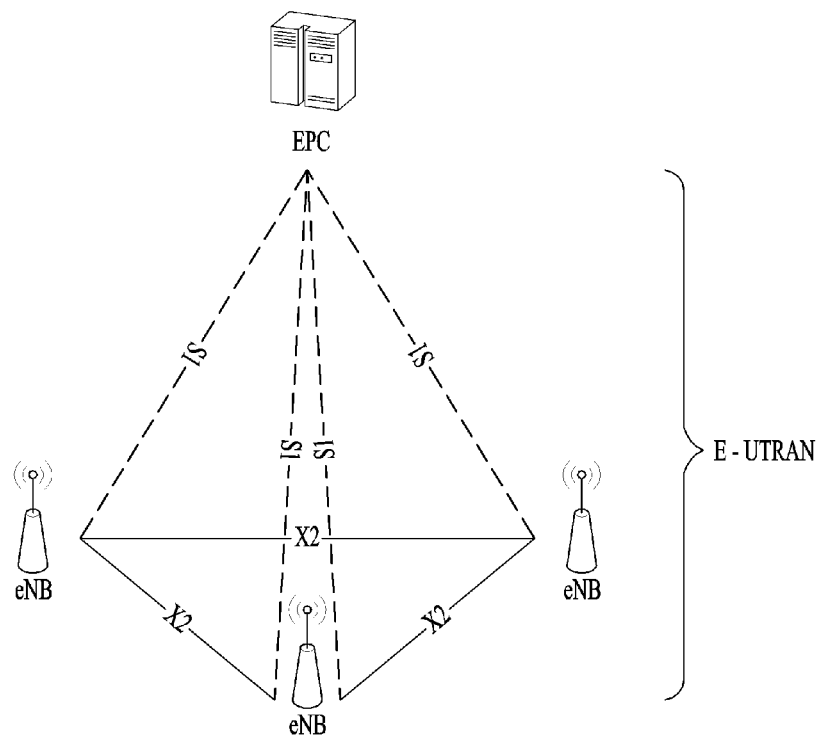

[Fig. 3]
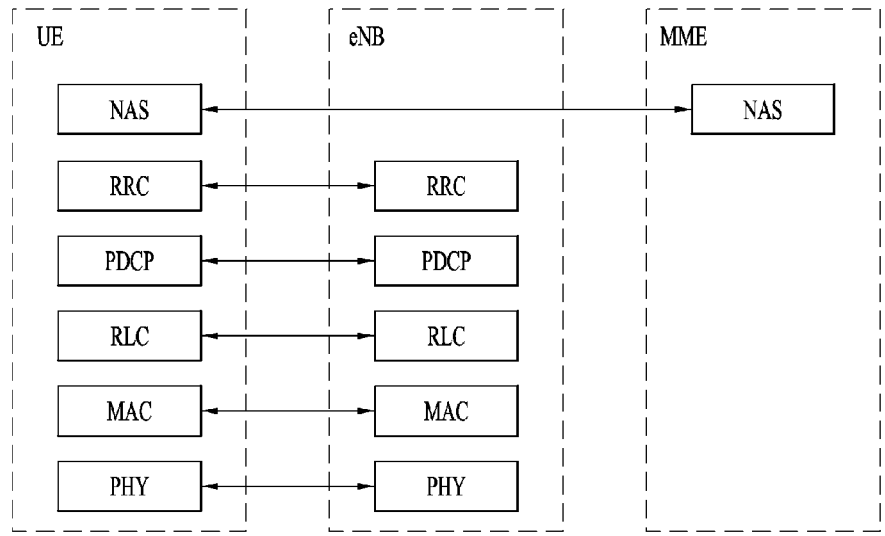
(a) Control-Plane Protocol Stack
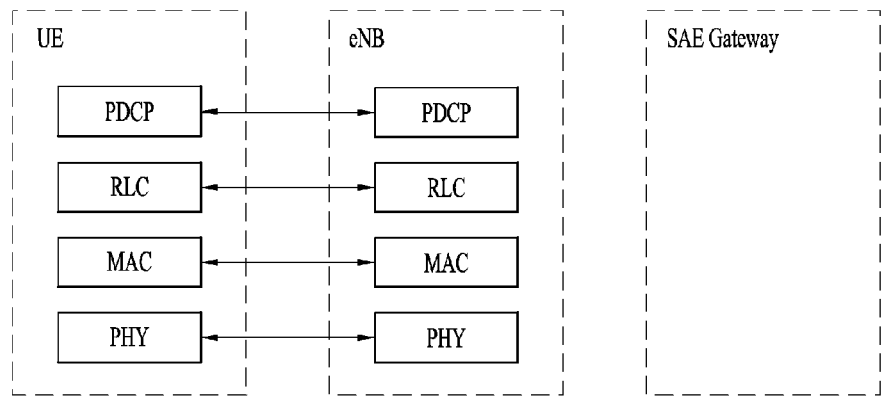
(b) User-Plane Protocol Stack
[Fig. 4]
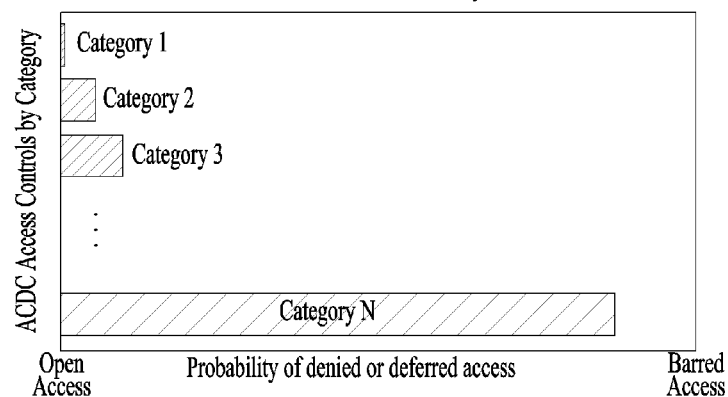

[Fig. 5]
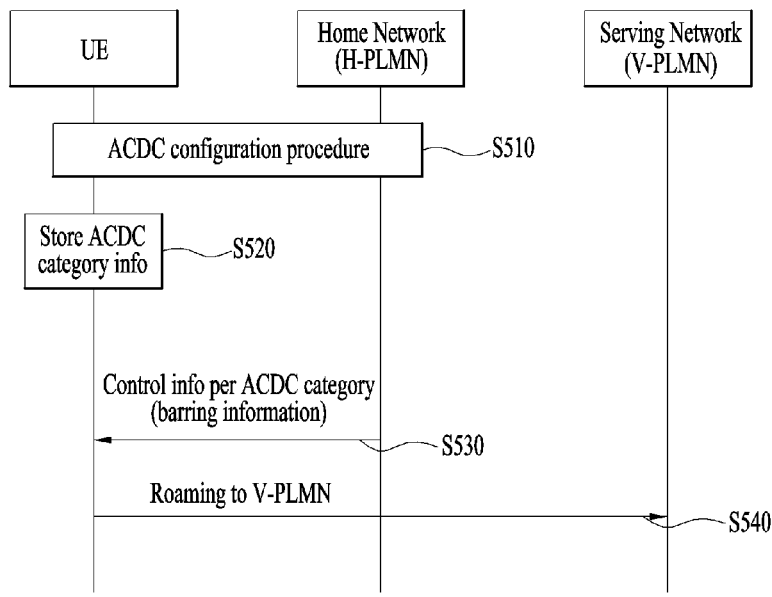
[Fig. 6]
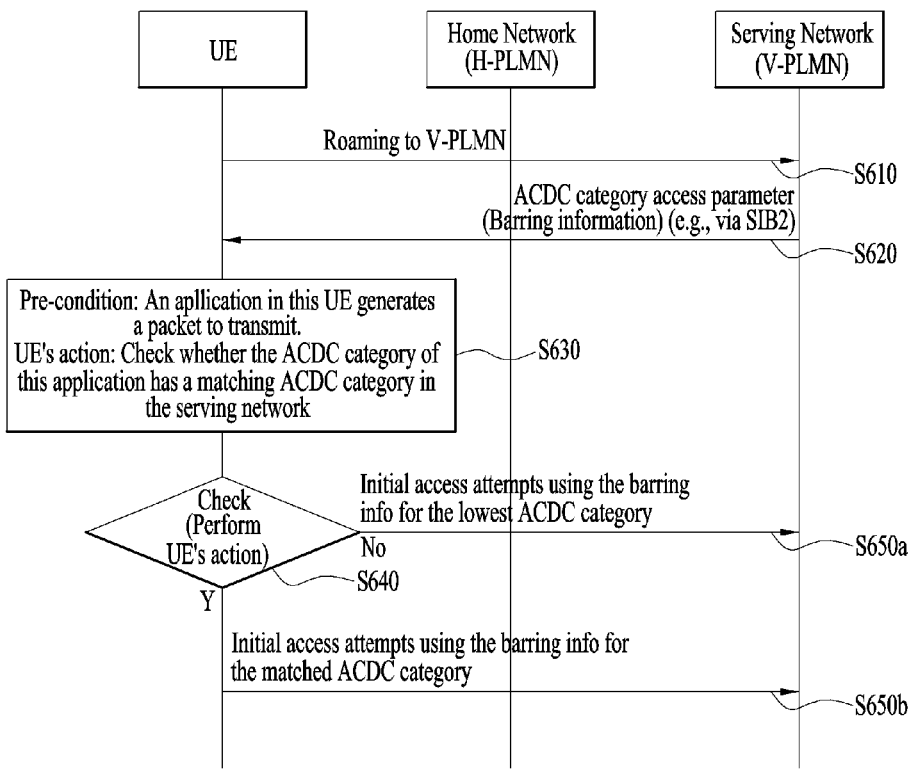

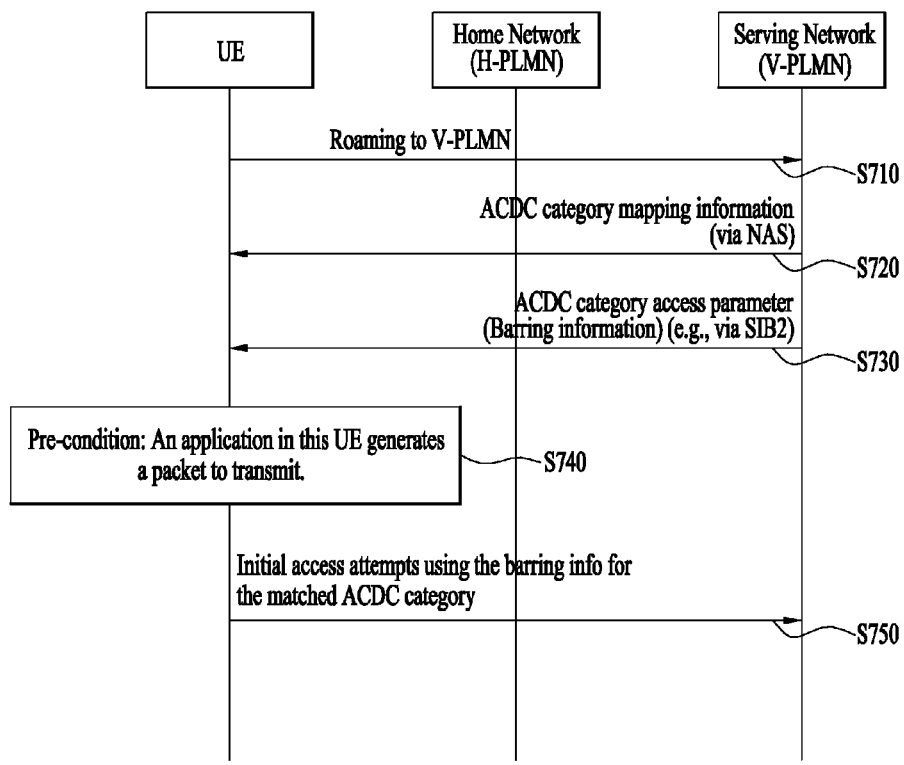
[Fig. 7]

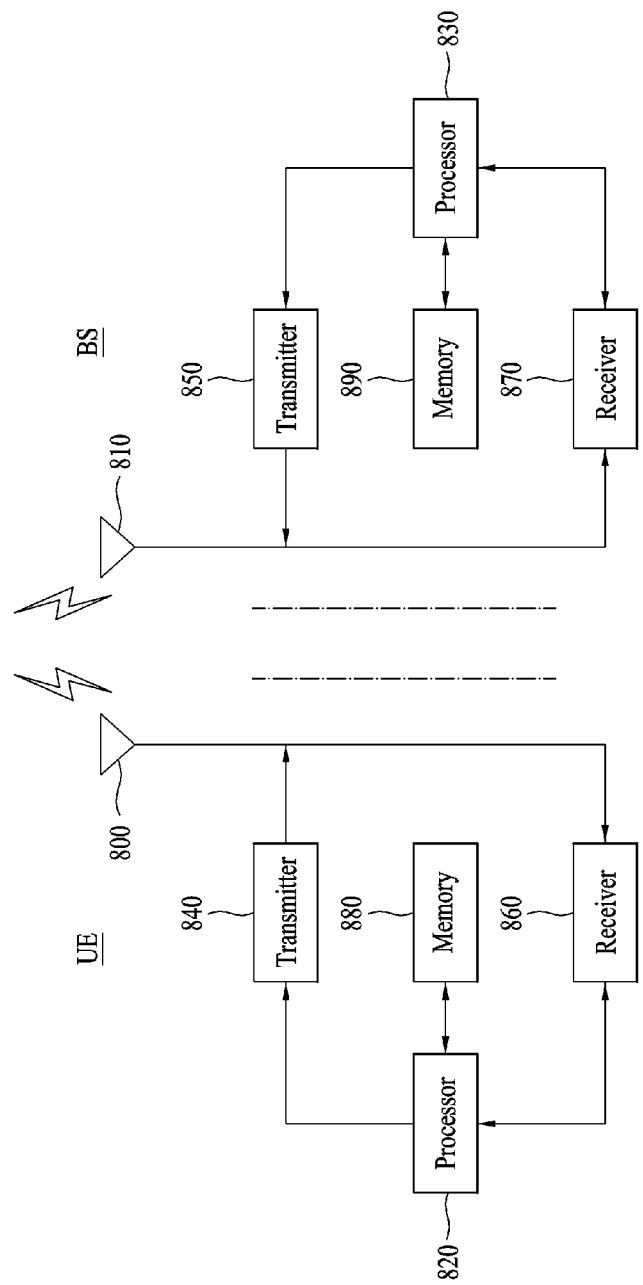
[Fig. 8]

METHOD AND APPARATUS FOR PREFORMING INITIAL ACCESS BASED ON THE ACDC CATEGORY IN A WIRELESS ACCESS SYSTEM

CROSS REFERENCE TO RELATED APPLICATIONS

This application is the National Phase of PCT International Application No. PCT/KR2016/003042, filed on Mar. 25, 2016, which claims priority under 35 U.S.C. 119(e) to U.S. Provisional Application No. 62/138,364, filed on Mar. 25, 2015, all of which are hereby expressly incorporated by reference into the present application.

TECHNICAL FIELD

The present invention relates to a wireless access system, and more particularly, to methods and apparatus for performing initial access based on the Application specific Congestion control for Data Communication (ACDC) category mapping scheme.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE OF INVENTION

Technical Problem

Accordingly, the object of the present invention is to provide methods for effectively transmitting application packets when the serving network has been congested.

Another object of the present invention is to provide methods for performing an initial access procedure according to the ACDC category and ACDC parameter when the serving network is congested due to the over traffic or digester situations.

Still another object of the present invention is to provide ACDC methods when the ACDC categories of the home network and the serving network are not matched.

Still another object of the present invention is to provide a user equipment (UE) and/or an eNB apparatus for supporting the above-described methods.

Technical problems to be solved by the present invention are not limited to the above-mentioned technical problem, and other technical problems not mentioned above can be clearly understood by one skilled in the art from the following description.

Solution to Problem

The present invention provides methods and apparatus for performing initial access based on the Application specific Congestion control for Data Communication (ACDC) category mapping scheme.

In one aspect of the present invention, a method for performing initial access based on an Application specific Congestion control for Data Communication (ACDC) category in a wireless access system, the method performed by a user equipment (UE) and comprising: receiving, from a home network, ACDC configuration information representing ACDC categories supported by the home network; receiving, from a serving network, ACDC category access parameters including barring information of the serving network; and performing the initial access based on the ACDC configuration information and the ACDC category access parameters when an application packet to be transmitted is generated, wherein the barring information includes barring time value and barring factor value representing a probability of denied or deferred of the initial access according to ACDC category of the serving network.

If an ACDC category for the application packet is not supported by the serving network, the initial access may be performed according to an ACDC category access parameter value of an ACDC category with the lowest priority in the serving network.

The method may further comprise the step of checking whether the ACDC category for the application packet is matched with the ACDC category of the serving network.

The method may further comprise the step of receiving, from the serving network, a ACDC category mapping information via a Non-Access Stratum (NAS) layer, wherein the ACDC category mapping information represents a mapping relationship among ACDC categories of the home network and ACDC categories of the serving network.

The initial access may be performed based on the ACDC category mapping information and the ACDC category access parameter.

The initial access may be performed according to an ACDC category of the serving network, which is matched with an ACDC category of the application packet, and the ACDC category access parameter value corresponding to the ACDC category of the serving network.

The ACDC category access parameters may be transmitted via system information block (SIB).

In another aspect of the present invention, a user equipment (UE) for performing initial access based on an Application specific Congestion control for Data Communication (ACDC) category in a wireless access system, the UE comprising transmitter; receiver; and processor operatively connected with the transmitter and the receiver. In this case, the processor may be configured to: receive, by controlling the receiver, ACDC configuration information representing ACDC categories supported by the home network; receive, by controlling the receiver, ACDC category access parameters including barring information of the serving network; and perform, by controlling the transmitter and the receiver, the initial access based on the ACDC configuration information and the ACDC category access parameters when an application packet to be transmitted is generated, and wherein the barring information includes barring time value and barring factor value representing a probability of denied or deferred of the initial access according to ACDC category of the serving network.

If an ACDC category for the application packet is not supported by the serving network, the initial access may be performed according to a ACDC category access parameter value of a ACDC category with the lowest priority in the serving network.

The processor may be further configured to check whether the ACDC category for the application packet is matched with the ACDC category of the serving network.

The processor may be further configured to receive, from the serving network, a ACDC category mapping information via a Non-Access Stratum (NAS) layer, wherein the ACDC category mapping information represents a mapping relationship among ACDC categories of the home network and ACDC categories of the serving network.

The initial access may be performed based on the ACDC category mapping information and the ACDC category access parameter.

The initial access may be performed according to an ACDC category of the serving network, which is matched with an ACDC category of the application packet, and the ACDC category access parameter value corresponding to the ACDC category of the serving network.

ACDC category access parameters may be transmitted via system information block (SIB).

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects of Invention

According to exemplary embodiments of the present invention, the following advantages can be obtained.

First of all, it is possible that application packets can be effectively transmitted even though the serving network has been congested.

Moreover, the roaming UE can attempt to initial access according to the ACDC category and ACDC parameter even though the serving network is congested and the ACDC categories of the home network and the serving network are not matched.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiments of the invention and together with the description served to explain the principle of the invention. In the drawings:

FIG. 1 illustrates a schematic structure a network structure of an evolved universal mobile telecommunication system (E-UMTS);

FIG. 2 illustrates a schematic structure of an Evolved Universal Terrestrial Radio Access Network (E-UTRAN);

FIG. 3 illustrates the configurations of a radio interface protocol between the E-UTRAN and a UE;

FIG. 4 illustrates an ACDC category control priority for the respective ACDC categories which can be applied to the embodiments of the present invention.

FIG. 5 illustrates the procedure of receiving control information for the ACDC from the home network.

FIG. 6 illustrates one of methods for performing an initial access when ACDC categories of the roaming UE are not matched with ACDC categories of the serving network.

FIG. 7 illustrates another of methods for an initial access when ACDC categories of the roaming UE are not matched with ACDC categories of the serving network.

FIG. 8 shows apparatuses for implementing the above-mentioned methods described with reference to FIGS. 1 through 7.

MODE FOR THE INVENTION

Exemplary embodiments of the present invention provide a method and apparatus for notifying authenticity information of caller identity.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between an enhance Node B (eNB) and a user equipment (UE). The eNB refers to a terminal node of a network, which directly or indirectly communicates with a UE. A specific operation described as being performed by the eNB may be performed by an upper node of the eNB.

Namely, it is apparent that, in a network comprised of a plurality of network nodes including the eNB, various operations performed for communication with a UE may be performed by the eNB, or network nodes other than the eNB. The term 'eNB' may be replaced with a fixed station, an ABS (Advanced Base Station), or PLMN etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an UE may serve as a transmitter and a eNB (or NB) may serve as a receiver, on uplink. Likewise, the UE may serve as a receiver and the eNB (or NB) may serve as a transmitter, on downlink.

The embodiments of the present invention are supported by standard documents disclosed for at least one of wireless access systems including a 3GPP system, a 3GPP LTE system, and a 3GPP2 system. In particular, the embodiments of the present invention are supported by 3GPP TS 22.806, 3GPP TS 21.011 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink Information transmitted and received between the UE and the BS includes general data information and control information. A variety of physical channels are provided according to type/use of information transmitted and received between the UE and the BS.

1.1 System Architecture

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network". In these days, an evolved system of the 3GPP LTE has been appeared and it is referred as 3GPP LTE-A (3GPP LTE advanced) system. Details of the technical specifications of the 3GPP LTE-A system are referred to Releases 9 to 12.

Referring to FIG. 1, the E-UMTS mainly includes a User Equipment (UE), base stations (or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

FIG. 2 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (e.g., S1-MME) is defined between the eNB and the MME (Mobility Management Entity). The S1 interface performs following functions: EPS (Evolved Packet System) Bearer Service Management function, NAS (Non-Access Stratum) Signaling Transport function, Network Sharing Function, MME Load balancing Function and the like.

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management. NAS layer situated above RRC layer performs such a function as a session management and a mobility management and the like. In the NAS layer, in order to manage mobility of a user equipment, two kinds of states EMM-REGISTERED (EPS mobility Management-REGISTERED) and EMM-DEREGISTERED are defined. These two states may apply to a user equipment and an MME. A user equipment in an early stage is in EMM-DEREGISTERED state. In order to access a network, this user equipment performs a process for registering with the corresponding network via an initial attach procedure. If the attach procedure is successfully completed, each of the user equipment and the MME enters EMM-REGISTERED states.

In order to manage a signaling connection between a user equipment and an EPC, two kinds of states ECM-IDLE (EPS connection management) and ECM-CONNECTED are defined in the NAS layer. These two states may apply to a user equipment and an MME. If a user equipment in ECM-IDLE state establishes an RRC connection with E-UTRAN, the corresponding user equipment is in ECM-CONNECTED state. If MME in ECM-ILDE establishes S1 connection with E-UTRAN, the corresponding MME enters ECM-CONNECTED state.

When a user equipment is in ECM-IDLE state, E-UTRAN may not have information (context) of the user equipment. Hence, the user equipment in ECM-IDLE state may perform a UE based mobility related procedure such as a cell selection and a cell reselection without receiving a command from a network. On the contrary, when a user equipment in ECM-CONNECTED state, mobility of the user equipment is managed by a command given by a network. If a location of a user equipment in ECM-IDLE state deviates from a location known to a network, the user equipment informs the network of a corresponding location of the user equipment through a tracking area update procedure.

One cell of the eNB is set to use a carrier bandwidth such as 1.25, 2.5, 5, 10 or 20 MHz to provide a downlink transmission or uplink reception service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Location Registration

A Public Land Mobile Network (PLMN) is a network established and operated by an Administration or a RPOA (Recognized Private Operating Agency) for the specific purpose of providing land mobile communication services to the public. The PLMN provides communication possibilities for mobile users. For communication between mobile and fixed users, interworking with a fixed network is necessary. Therefore, PLMNs shall provide a location registration function with the main purpose of providing continuity of service to UEs over the whole system area. The location registration function shall be such as to allow:

Fixed subscribers to call a UE by only using the directory number of the UE irrespective of where the UE is located in the system area at the time of the call.

UEs to access the system irrespective of the location of the UE.

UEs to identify when a change in location area has taken place in order to initiate automatic location updating procedures.

In the embodiments of the present invention, a Home Public Land Mobile Network (HPLMN) and a Visited Public Land Mobile Network (VPLMN) can be defined. The HPMLN is a PLMN where the Mobile Country Code (MCC) and Mobile Network Code (MNC) of the PLMN identity are the same as the MCC and MNC of the International Mobile Subscriber Identity (IMSI) or the de?ned Equivalent HPLMN (EHPLMN). In addition, the VPLMN is a PLMN on which the mobile subscriber has roamed when leaving their Home PLMN. In addition, the HPLMN can be referred to a home network and the VPLMN can be referred to a serving network in the embodiments of the present invention.

2. Application Specific Congestion Control for Data Communication (ACDC)

UEs on which user can easily download applications from web sites are rapidly increasing in the world and a wide variety of applications are constantly created and installed on the UEs. Once network congestion happens, it is necessary, depending on the regional regulation and/or operator policy, that certain types of applications should be barred from accessing the network. Specific applications can (intentionally or unintentionally) cause congestion over RAN/

CN. While network is congested, it is not desirable to allow these applications to access the network in order to protect the network resources.

On the other hand, for example in Japan, after the severe earthquake on Mar. 11, 2011, the packet based communication applications that users can invoke to confirm the safety of their relatives are recognized as important applications (e.g. Disaster Message Board (DMB) service, Disaster voice messaging service) when disaster occurs. Therefore, Japanese government strongly expects Japanese operators to provide the connectivity at least for such services even when the network is highly congested, while other services are barred to free up the resources for important services.

For example, when some disaster has been occurred, the users try to access to the network for calling to their relatives or friends. Therefore, the RACH congestion can be highly increased since the simultaneous attempts to call will be caused.

The intent of ACDC is to apply access controls in a less indiscriminate way compared to Access Class Barring (ACB). Whereas ACB applies equally on all ordinary UEs, regardless of the purpose of an access attempt from a UE, ACDC groups applications in categories of importance, and applies access controls to lesser categories first, sparing more important applications from denial or deferral of access until and unless level of congestion is severe enough that they must also be affected.

2.1 Roaming Compatibility when ACDC Categorization is Honored in Roaming UEs

In ACDC it is necessary to group mobile originated applications into access categories (hereafter called "ACDC categories"), so that each category is independently controlled in terms of ability to permit network access as the application is started in the UE (usually, but not always, by user action to launch an application). Grouping into categories is necessitated because there are too many mobile applications to be each individually controlled.

Each operator should have flexibility to independently create ACDC categories by provisioning them into UEs it activates on its system. This brings into question ACDC roaming compatibility. This use case addresses the question on how ACDC access controls implemented by VPLMN (i.e., serving network) may apply to a roaming UE, if so permitted by the VPLMN (i.e., serving network), when ACDC categorization in the VPLMN (i.e., serving network) of the roaming UE may be different than the categorization in the HPLMN of the UE.

That is, the ACDC categories can be independently and differently configured according to the preference or regional regulatory requirement of the operators (PLMNs) but the roaming UE should follow the access barring information signaled by the serving network when roaming (i.e., VPLMN). In addition, the ACDC categories can be classified based on IP flows, application IDs and/or Access Point Names (APNs). For example, operator A and Z may create ACDC categories as Tables 1 and 2, respectively. Operator Z UEs have been provisioned by operator Z by creating M ACDC categories in the following Table 1.

TABLE 1

| Operator Z ACDC Category | Applications | Notes |
| --- | --- | --- |
| 1 | DMB | DMB (Disaster Message Board) is high priority point-to-point messaging service enabled by the operator in situations of natural or other kind of disaster, allowing friends and family to exchange messages even when network is highly congested. A high level DMB description can be found in TR 22.805 (UPCON Technical Report) [5]. |
| 2 | Voice Services | E.g., IMS with audio component only |
| 3 | Non-GBR TCP-based data services | |
| 4 | Point-to-point video services | |
| ... | ... | |
| M | All remaining services | |

Analogously, operator A UEs have been provisioned by operator A also for N ACDC categories as following Table 2.

TABLE 2

| Operator A ACDC Category | Applications | Notes |
| --- | --- | --- |
| 1 | Text-based human generated messaging services | Includes SMS and all forms of IP-based Instant Messaging services entailing contact lists, whether they are user-defined or downloadable from server. |
| 2 | Human-generated Multimedia Messaging Services; Certain vital M2M services | |
| 3 | Highly delay tolerant TCP-based data services; Remaining M2M services | |
| 4 | Adaptive video streaming services | |
| ... | ... | |
| N | All remaining services | |

It is assumed that operators A and Z both support ACDC and operator A's policy is to honor ACDC categorization provisioned in roaming UEs. In this case, Zbigniew is a user of UE1 which has been subscribed to operator Z.

Zbigniew (i.e., UE1) is roaming on Operator A network with roaming data services enabled based on one or more applications. During the roaming, a powerful earthquake can take place causing severe damage and other adverse effects in the city and surrounding area. Communication links are severely degraded, but there is still coverage in the area in the aftermath of the earthquake, though carrying capacity of the wireless network A is reduced.

As another consequence of the earthquake, intensity of both human and M2M communication rapidly increases, causing severe congestion in the wireless network A. In response to this situation, local radio access network A ACDC controls take effect, so that previously completely open access for all ACDC categories quickly turns into completely barred access for all but the highest ACDC category (i.e., ACDC category 1 in the tables above).

Thanks to the ACDC controls taking effect, network A congestion subsides, though only most critical ACDC category applications are allowed to access the network.

Zbigniew (i.e., the UE1) is unable to place a voice call to his family, due to classification to ACDC category 2, which is barred. However, Zbigniew is able to use DMB application classified in his UE1 as ACDC category 1, which is kept open by ACDC controls in this locality of network A, and the ACDC category 1 in the network A supporting the text based messaging services.

Analogously, network A home users cannot use voice services or multimedia messages to reach their loved ones, as those services are in ACDC category 2, which is barred. However, they can use text messaging and IM, since those are ACDC category 1 services.

In summary, even though there is no direct compatibility of classification of applications into ACDC categories between networks A and Z, Zbigniew (i.e., UE1) as a roaming user experiences network behavior related to access controls of applications similar to what he would have experienced if he was not roaming. Hence, a sufficient degree of roaming compatibility is achieved, while allowing each operator A and Z to independently configure ACDC categories.

FIG. 4 illustrates an ACDC class control hierarchy which can be applied to the embodiments of the present invention.

In the embodiments of the present invention, a limited number of ACDC categories can be defined, which shall be ranked from highest (least likely to be barred) to lowest (most likely to be barred). The horizontal axis represents probability of denied or deferred access and the vertical axis represents ACDC access controls by ACDC categories. That is, an application in the highest ACDC category can be access to the network even the congestion situation is occurred but an application in the lowest ACDC category can be barred or deferred according to the barring information of the network.

In this case, provisioning of ACDC categories in the UEs is the responsibility of HPLMN operator, and does not require strict adherence to a globally prescribed ACDC categorization.

In addition, when ACDC controls are imposed, normally, the level of access restrictions (probability of denied or deferred access) for each higher ranked ACDC category is lower than for any lower ranked ACDC category. This is schematically illustrated in FIG. 4. Note however that this is only nominal behavior (occurs in large majority of scenarios), from which the network operator is free to deviate if circumstances occasionally require.

2.2 ACDC Service

The ACDC is an access control mechanism for the operator to allow/prevent new access attempts from particular, operator-identified applications in the UE. The network can prevent/mitigate overload of the access network and/or the core network.

ACDC categories are ranked in the order of the probability of being restricted. The operator assigns an application that needs minimal restriction to a higher ranked ACDC category. This reduces the impact to access attempts from such applications. Structuring controls in this way ensures that the same principle holds for roaming UEs, if visited operator chooses to make ACDC applicable to roamers.

There may be many applications on a UE that are not assigned an ACDC category. Such applications may be treated by the UE as part of the lowest ranked ACDC category. If the operator requires differentiation with respect to these uncategorized applications, the operator may avoid assigning applications to the lowest ranked ACDC category.

For the ACDC service which can be adapted to the embodiments of the present invention, the following requirements can be applied.

(1) This feature can be applicable to UTRAN and E-UTRAN.

(2) This feature can be applicable to UEs that are not a member of one or more of Access Classes 11 to 15.

(3) The home network (i.e., the HPLMN) is able to configure a UE with at least four ACDC categories to each of which particular, operator-identified applications are associated.

(4) The ACDC categories can be ranked in order of the probability of being restricted.

Provisioning of the ACDC categories in the UE is the responsibility of the HPLMN operator and a mechanism needs to be provided that enables the UE to verify that the provisioning of the configuration originates from a trusted source.

(5) The serving network (i.e., the VPLMN is the serving network when a UE is roaming) is able to broadcast, in one or more areas of the RAN, access control information indicating barring rates per each ACDC category and whether a roaming UE is subject to ACDC control.

(6) The UE is able to control whether or not access attempt for certain application is allowed, based on this broadcast control information and the configuration of categories in the UE. In this case, communication already in progress is exempted from this control.

(7) The serving network is able to simultaneously indicate ACDC with other forms of access control.

(8) When both ACDC and ACB controls are indicated, ACDC shall override ACB.

(9) In the case of multiple core networks sharing the same access network, the access network is able to apply ACDC for the different core networks individually. For the mitigation of congestion in a shared RAN, barring rates should be set equal for all Participating Operators.

3. Methods for Mapping ACDC Categories while Roaming

When using ACDC is defined, it is possible that a UE belonging to one operator (HPLMN operator for this UE) moves into a visited network (VPLMN) where the HPLMN has a larger number of ACDC categories than this UE's VPLMN. In this case, the configuration of ACDC categories for the roaming UE is given by the HPLMN, but not by VLPMN.

In the present invention, the term of "application" may represent a software application installed by service providers, UE manufacturers or users. In addition, the applications may also represent services which are designed using service capability features. The applications can be supported and managed by the application layer for providing or transmitting application data according to the services to the lower layers of the user equipment or to the network.

FIG. 5 illustrates the procedure of receiving control information for the ACDC from the home network.

Referring to FIG. 5, the UE has subscribed to the home network (i.e., the H-PLMN) and the UE performs the ACDC configuration procedure with the H-PLMN. During the ACDC configuration procedure, the UE is able to receive ACDC configuration information from the H-PLMN. The ACDC configuration information indicates what applications are classified into the ADCD categories in the home network (H-PLMN) (S510).

The UE stores the ACDC category information of the home network (S520).

The home network transmits control information per ACDC categories according to the ACDC configuration information (S530).

If a channel condition of the home network become congested and the UE has data packet to transmit according to application, an initial access for the application can be performed based on the ACDC configuration information and the control information.

The UE may move from the home network to the serving network. In this case, it is assumed that serving network also supports the ACDC but the ACDC categories of the serving network can be independently defined from the home network (S540).

In case that a UE is roaming into a VPLMN (which is called the serving network while roaming), suppose that an application belonging to ACDC category V in the UE's home network (i.e., H-PLMN) attempts to access the serving network (i.e., VPLMN network) and suppose that the serving network has only four ACDC categories such as ACDC category I, II, III, and IV. Then in the current 3GPP specification, it is not defined how the roaming UE accesses the serving network if the UE has an initiation request from an application of ACDC category V.

FIG. 6 illustrates one of methods for performing an initial access when ACDC categories of the roaming UE are not matched with ACDC categories of the serving network.

For each operator, an application indicates an application identifier (i.e., app-ID) to NAS (non-access stratum) so that NAS of the UE or the serving network examines the associated ACDC category based on that app-ID. The UE previously receives the ACDC configuration information from its home network (see, FIG. 5).

Referring to FIG. 6, the UE moves to the serving network and the UE becomes a roaming UE in the serving network (S610).

After roaming to the serving network, the roaming UE is able to receive the ACDC category access parameters including barring information via SIB2 message from the serving network. The ACDC category access parameters include the barring information (or barring parameters). In this case, the barring information includes barring time and barring factor representing the probability of denied or deferred access. In addition, the barring information is defined for each of the ACDC categories in the serving network (S620).

When the UE is roaming into a serving network, the roaming UE cannot follow the serving network's ACDC configuration information since the roaming UE just visit in the serving network for a while. However, the UE is able to read the ACDC category access parameter values which are received from the serving network (see S620). By using the ACDC category access parameters, the UE is able to know which ACDC category has what values for its ACDC category access parameters for the specific application of a certain ACDC category. That is, the roaming UE having the ACDC configuration information of the home networks has to use the ACDC category access parameters of the serving networks when the roaming UE attempts the initial access for the application according to the ACDC configuration information.

The application or the application layer of the roaming UE generates a packet to transmit in the serving network. The packet is generated based on the service defined by the application (S630).

If the packet to be transmitted has been generated, the roaming UE checks whether the ACDC category of the application has a matching ACDC category in the serving network by using the received ACDC category access parameter (S640).

At the step S640, if the roaming UE finds that the number of ACDC categories in the serving network is smaller than that in the home network and if the roaming UE finds that the ACDC category of the application of the roaming UE does not exist in the ACDC configuration information of the serving network, the roaming UE tries to use the ACDC category access parameter values of the ACDC category with the lowest priority in the serving network. That is, the roaming UE attempts an initial access to the serving network using the barring information for the lowest ACDC category (S650a).

For example, an ACDC category V application of a UE is attempting to access to the serving network. However, the serving network has only four ACDC categories in its configuration (e.g., ADCD category I, II, III, and IV). In this case, in the previous arts, there is no way that the roaming UE attempts to initial access to the serving network because the serving network does not support the ACDC category V. However, the roaming UE of the present invention is able to try to use the ACDC access parameter values of ACDC category IV of the serving network for the application of the ACDC category V of the roaming UE. The ACDC category IV of the serving network is the lowest priority in the serving network.

At the step S640, if the ACDC category of the roaming UE's application has a matched ACDC category in the serving network, the roaming UE attempts the initial access to the serving network by using the barring information for the matched ACDC category in the serving network (S650b).

By using the ACDC access parameters of the lowest ACDC category of the serving network, the impact caused from the roaming UE's initial access for the application can be reduced to the users in the serving network.

If the roaming UE successfully attached to the serving network after the initial access, the roaming UE is able to transmit the application packet to the serving network.

FIG. 7 illustrates another of methods for an initial access when ACDC categories of the roaming UE are not matched with ACDC categories of the serving network.

In the embodiment explained by FIG. 7, it is assumed that all of the operators have a roaming agreement between neighbor networks. For example, an operator A (e.g., a first operator) of the home network (i.e., HPLMN) already has a roaming agreement with another operator B (e.g., a second operator) of the serving network (i.e., VPLMN).

Under this situation, referring to FIG. 7, the UE moves to the serving network and the UE becomes a roaming UE in the serving network (S710).

The serving network broadcasts ACDC category mapping information via NAS layer. The ACDC category mapping information is configured based on the roaming agreement between the first and the second operators. The ACDC category mapping information represent mapping relationships of the ACDC categories between the home network and the serving network (S720).

For example, the ACDC category mapping information can be configured as following Table 3 between Operator A (with N4 ACDC categories) and Operator B (with M4 ACDC categories, where n_i is not equal to m_j (e.g., n4 !=m4)).

TABLE 3

| ACDC category mapping information | Home Network | Serving Network |
|---|---|---|
| 0b00 | N1 | M1 |
| 0b01 | N2 | M2 |
| 0b10 | N3 | M3 |
| 0b11 | N4 | M4 |

That is, if both of the networks support the same number of ACDC categories, the mapping relationship can be defined as in Table 3. Table 3 is merely one of examples of mapping relationships and there are many variations of the mapping which are satisfying one to one relationship between the ACDC categories.

The following Tables 4 and 5 represent examples of the ACDC category mapping information when the unequal numbers of ACDC categories are supported by the operators A and B.

TABLE 4

| ACDC category mapping information | Home Network | Serving Network |
|---|---|---|
| 0b000 | N1 | M1 |
| 0b001 | N2 | M2 |
| 0b010 | N3 | M3 |
| 0b011 | N4 | M4 |
| 0b100 | N5 | M4 |
| 0b101~111 | Reserved | Reserved |

Referring to Table 4, the number of ACDC categories of the home network is 5 while the number of ACDC categories of the serving network is 4. In this case, the remaining ACDC category of the home network can be matched to the lowest ACDC categories of the serving network.

TABLE 5

| ACDC category mapping information | Home Network | Serving Network |
|---|---|---|
| 0b000 | N1 | M1 |
| 0b001 | N2 | M1 |
| 0b010 | N3 | M2 |
| 0b011 | N4 | M2 |
| 0b100 | N5 | M3 |
| 0b101 | N6 | M3 |
| 0b110 | N7 | M4 |
| 0b111 | N8 | M4 |

Referring to Table 5, the number of ACDC categories of the home network is 8 while the number of ACDC categories of the serving network is 4. In this case, the ACDC categories of the home network can be matched to the ACDC categories of the serving network based on the service flow, data type, or service type of the applications. For example, if the application belonging to the ACDC category M1 of the operator B supports {IP Multimedia Subsystem (IMS) voice, IMS video} and each of applications of the ACDC categories N1 and N2 of the operator A supports {IMS voice} and {IMS video}, the ACDC categories N1 and N2 of the home network can be matched to the ACDC category M1 of the serving network.

The ACDC category mapping information illustrated on Tables 3 to 5 are represented as index manner but the ACDC category mapping information can be transmitted by a bitmap scheme or directly represented what category of the roaming UE is matched to the ACDC category of the serving network. How to transmit the ACDC category mapping information can be selected by the network or predefined.

Referring back to FIG. 7, after roaming to the serving network, the roaming UE is able to receive the ACDC category access parameters including barring information via SIB2 message from the serving network. The ACDC category access parameters include the barring information (or barring parameters) which is defined for each of the ACDC categories in the serving network. In this case, the barring information includes barring time and barring factor representing the probability of denied or deferred access (S730).

When the UE is roaming into a serving network, the roaming UE cannot follow the serving network's ACDC configuration information since the roaming UE just visit in the serving network for a while but the UE is able to read the ACDC category mapping information and the ACDC category access parameter values which are received from the serving network.

In this case, the application or the application layer of the roaming UE may generate a packet to transmit in the serving network. The packet is generated based on the service defined by the application (S740).

The roaming UE reads the ACDC access parameter value which is matched to the ACDC category of the home network to see which ACDC category of the serving network has what access parameters values. In addition, the roaming UE is able to read the ACDC category mapping information in order to find the serving network's ACDC category for reading the ACDC access parameters values for the application attempting to access the serving network.

Therefore, the roaming UE can attempts to initial access using the barring information for the matched ACDC category (S750).

If the roaming UE successfully attached to the serving network after the initial access, the roaming UE is able to transmit the application packet to the serving network.

Meanwhile, another embodiment of the present invention can be applied based on the concept of the method in FIG. 7. For example, the VPLMN network broadcasts ACDC category mapping information representing that ACDC category V from the roaming UE's HPLMN is mapped to ACDC category IV in the VPLMN. In this case, an ACDC category V application of the roaming UE is attempting to access to VPLMN network. However, the ACDC category V of HPLMN is mapped to ACDC category IV in this VPLMN. Therefore, the roaming UE tries to use the ACDC access parameters values of ACDC category IV of VPLMN when the application of the roaming UE wishes to transmit the packet belonging to the ACDC category V of the HPLMN. The ACDC category V from this UE's HPLMN is mapped to ACDC category IV in the VPLMN.

4. Apparatuses for Implementing the Aforementioned Methods

FIG. 8 shows apparatuses for implementing the above-mentioned methods described with reference to FIGS. 1 to 7.

A UE can serve as a transmitting end on uplink and as a receiving end on downlink. An eNB can serve as a receiving end on uplink and as a transmitting end on downlink.

The UE and the eNB may include a transmitter 840 and 850 and receiver 860 and 870 for controlling transmission and reception of signal, data and/or messages and antennas 800 and 810 for transmitting and receiving signal, data and/or messages, respectively.

In addition, the UE and the eNB may respectively include processors 820 and 830 for performing the above-described embodiments of the present invention and memories 870 and 890 for storing processing procedures of the processors temporarily or continuously.

The embodiments of the present invention can be performed using the aforementioned components and functions of the UE and the eNB. The apparatuses shown in FIG. 8 may be one of members illustrated in FIGS. 1 and 2. In addition, the eNB in FIG. 8 can be referred to the HPLMN or the VPLMN.

The serving network having the eNB may transmit the ACDC category access parameter values to the roaming UE. If the UE receives the ACDC category access parameter, the processor of the UE is able to know which ACDC category has what values for its ACDC category access parameters for the specific application of the certain ACDC category. In addition, the processors of the serving network and the home network share the ACDC category mapping information and transmit it to the UE by controlling the transmitter. The UE is able to attempt an initial access based on the ACDC category mapping information and/or the ACDC category access parameter. The specific embodiments by performing the UE and the eNB can be referred to the embodiments explained above.

The transmitter 840 and 850 and the receiver 860 and 870 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

The invention claimed is:

1. A method for performing initial access based on an Application specific Congestion control for Data Communication (ACDC) category in a wireless access system, the method performed by a user equipment (UE) and comprising:
   receiving, from a home network, ACDC configuration information representing ACDC categories supported by the home network;
   receiving, from a serving network different from the home network, ACDC category access parameter values including barring information of the serving network;
   receiving, from the serving network, ACDC category mapping information including a mapping relationship between ACDC categories of the home network and ACDC categories of the serving network via a Non-Access Stratum (NAS) layer; and
   performing the initial access when an application packet to be transmitted is generated,
   wherein the barring information includes a barring time value and a barring factor value representing a probability of denial or deferral of the initial access according to the ACDC categories of the serving network, and
   wherein the initial access is performed according to i) an ACDC category of the serving network, which is matched with an ACDC category of the application packet based on the ACDC configuration information and the ACDC category mapping information, and ii) an ACDC category access parameter value corresponding to the ACDC category of the serving network among the ACDC category access parameter values.

2. The method according to claim 1, wherein the ACDC category access parameter values are transmitted via a system information block (SIB).

3. A user equipment (UE) for performing initial access based on an Application specific Congestion control for Data Communication (ACDC) category in a wireless access system, the UE comprising:
   a transmitter;
   a receiver; and
   a processor operatively connected with the transmitter and the receiver,
   wherein the processor is configured to:
      control the receiver to receive, from a home network, ACDC configuration information representing ACDC categories supported by the home network,
      control the receiver to receive, from a serving network different from the home network, ACDC category access parameters including barring information of the serving network,
      control the receiver to receive, from the serving network, ACDC category mapping information including a mapping relationship between ACDC categories of the home network and ACDC categories of the serving network via a Non-Access Stratum (NAS) layer, and control the transmitter and the receiver to perform the initial access when an application packet to be transmitted is generated, wherein the barring information includes a barring time value and a barring factor value representing a probability of denial or deferral of the initial access according to the ACDC categories of the serving network, and wherein the initial access is performed according to i) an ACDC category of the serving network, which is matched with an ACDC category of the application packet based on the ACDC configuration information and the ACDC category mapping information, and ii) an ACDC category access parameter value corresponding to the ACDC category of the serving network among the ACDC category access parameter values.

4. The UE according to claim 3, wherein the ACDC category access parameter values are transmitted via a system information block (SIB).

* * * * *